> United States Patent Office 2,807,616
Patented Sept. 24, 1957

2,807,616

OXAZOLOPYRIMIDINES AND METHOD OF PREPARING SAME

Elvira A. Falco, New Rochelle, Gertrude B. Elion, Bronxville, and George H. Hitchings, Tuckahoe, N. Y., assignors to Burroughs Wellcome & Co. (U. S. A.) Inc., Tuckahoe, N. Y., a corporation of New York No Drawing. Application October 9, 1952, Serial No. 313,978

8 Claims. (Cl. 260—256.4)

This invention relates to oxazolo (5,4-d) pyrimidines of the formula

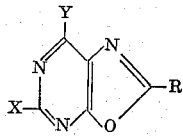

wherein R is selected from the class consisting of alkyl and phenyl groups and hydrogen, X and Y are selected from the class consisting of alkyl and amino groups, chlorine and hydrogen, and a novel method for their preparation. These derivatives are valuable antimetabolites in veterinary and human medicine.

These compounds are prepared by the reaction of a 5-amido-4-hydroxypyrimidine with phosphoryl chloride according to the following equation:

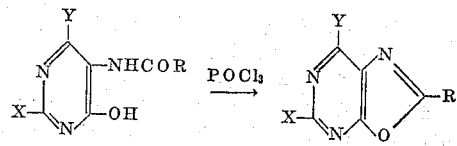

wherein R, X and Y have the above values.

In general the reaction of 5 - amido - 4 - hydroxy- 6-aminopyrimidines with phosphoryl chloride forms purine compounds as the major product. In accordance with the present invention it has also been found that oxazolopyrimidines are obtained in substantial yield by the reaction of 5-amido-4-hydroxy-6-aminopyrimidines with phosphoryl chloride in the presence of from about 1 to around 15% water in the reaction mixture. Under these conditions the desired compounds are readily obtained in substantial yield while the quantity of purine is reduced to a minimum. This present method may be illustrated by the general formula:

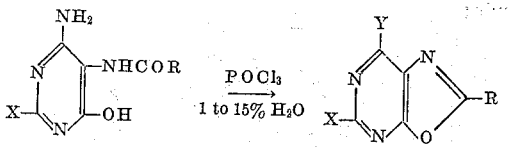

wherein R, X and Y have the above indicated values. It has been found, however, that the cyclization of 5-amido-4-hydroxypyrimidines with phosphoryl chloride is a quite general reaction and a considerable variety of oxazolo (5,4-d) pyrimidines are obtainable by this method. The presence of amino groups at the 6 position of the pyrimidine ring leads to the formation of purine and decreases the yield of oxazolopyrimidine. Accordingly somewhat larger quantities of oxazolopyrimidine are obtained by the selection of pyrimidines containing no amino group at the 6 position of the ring in order to prevent the formation of purine. In such cases ordinary commercial phosphoryl chloride without addition of water is an adequate cyclizing agent although the hydrated phosphoryl chloride is still probably somewhat superior, where the 6 position of the pyrimidine ring is occupied by a hydroxyl group, this is chlorinated and the oxazolopyrimidine bears a 7-chloro substituent. Substantial yields of oxazolopyrimidines have been obtained by the reaction of 5-amido-4-hydroxypyrimidine substituted at the 2 and 6 positions with alkyl groups, with phosphoryl chloride. The resulting products are sparingly soluble in water but are soluble in organic solvents from which they are easily crystallized by general methods.

EXAMPLE 1

2-phenyl-oxazolo-(5,4-d) pyrimidine

The 5-benzamido-4-hydroxypyrimidine is heated at reflux temperature with 10 ml. of phosphoryl chloride per gram of amide. The excess phosphoryl chloride is removed under reduced pressure and the syrupy residue is poured over ice. The mixture is then made alkaline and the oxazolopyrimidine obtained by filtration of the alkaline solution. The compound was purified by sublimation at 0.03 mm. after evaporation of the solvent and obtained in yield of 52% having a M. P. of 113–116° C.

EXAMPLE 2

5-methyl-2-phenyl-oxazolo-(5,4-d) pyrimidine 5-benzamido-4-hydroxy-2-methylpyrimidine was prepared by the condensation of ethyl formylhippurate (48 g. of crude sodium derivative) with acetamidine (4.6 g. of the hydrochloride and 2.7 g. of the potassium hydroxide) in 150 ml. of water at room temperature for 72 hours. After recrystallization from ethanol 2.45 g. of the compound were obtained melting at 294–295° C. (dec.). This compound was heated at reflux temperature with 10 ml. of phosphoryl chloride per gram of amide as before. The excess phosphoryl chloride was removed under reduced pressure and the residue poured over ice. The product was recovered by ether extraction from neutral solution and purified by recrystallization from aqueous solution. It was obtained in 68% yield having a M. P. of 122° C.

EXAMPLE 3

5,7-diamino-2-(3'-nitrophenyl)-oxazolo-(5,4-d) pyrimidine 2,6-diamino-4-hydroxy-5-(3' - nitrobenzamido) pyrimidine is heated at reflux temperature with 10 ml. of phosphoryl bromide per gram of amide. The excess phosphoryl bromide is removed under reduced pressure and the residue cooled over ice. The mixture was made alkaline and the produce obtained by filtration of the alkaline solution. It was obtained in 50% yield when recrystallized from ethyl acetate having a M. P. of 291–292° C. (dec.).

The following method illustrates the preparation of oxazolopyrimidines from compounds having a tendency to form purines.

EXAMPLE 4

7-amino-2-(4'-chlorophenyl)-oxazolo-(5,4-d) pyrimidine 14 g. of 4-amino-5-(4'-chlorobenzamido)-6-hydroxypyrimidine was refluxed for 3 hours with 140 g. of commercial phosphoryl chloride to which 3 cc. of water had been added. The recess phosphoryl chloride was removed under reduced pressure and the residue poured over ice where the mixture was then adjusted to pH 10 with 2N sodium hydroxide. The insoluble material which was the crude oxazole was then filtered off and the filtrate neutralized with acetic acid to precipitate the 8-(4'-chlorophenyl)-6-chloropurine. The oxazolopyrimidine was crystallized from a large volume of ethyl acetate in pale yellow plates at a yield of 47%, having a M. P. of 320° C.

EXAMPLE 5

*5-dimethylamino-2,7-dimethyl-oxazolo-(5,4-d) pyrimidine*

1 g. of 5-amino-2-dimethylamino-4-methyl-6-hydroxypyrimidine made by the method of P. B. Russell [J. Amer. Chem. Soc. 71, 474 (1949)] was refluxed with 20 ml. of acetic anhydride for 1 hour. The excess anhydride was removed under reduced pressure and the residue recrystalized from ethanol, yielding 800 mg. of 5-acetamido-2-dimethyl-amino - 4 - methyl - 6 - hydroxypyrimidine melting at 225–227° C. This compound was treated in accordance with the procedure of Example 1 to obtain the above compound which was purified by sublimation and had a melting point of 83–84° C.

EXAMPLE 6

*5,7-dimethyl-oxazolo-(5,4-d) pyrimidine*

2 g. of 5-amino-2,4-dimethyl-6-hydroxypyrimidine prepared by the method of Andersag et al. [Ber., 70, 2045 (1937)] was heated to boiling with 30 ml. of 98% formic acid for ½ hour and then evaporated to dryness on the steam bath. The residue was taken up in 20 ml. of water and neutralized with dilute ammonium hydroxide solution. The product was recrystallized from 95% ethanol and formed needles melting at 245–248°. This compound was treated with phosphoryl chloride as set forth in Example 1 and the product was obtained in 10% yield having a M. P. of 118–119° C.

The oxazolopyrimidine is obtained by filtration of the alkaline solution in the case of most of the 2-phenyl derivatives. However, ether extraction from neutral solution is generally employed for the 2-unsubstituted, 2-methyl, 2-chloromethyl, 5-chloro-2-phenyl and unsubstituted 2-phenyl derivatives. Purification of the water insoluble oxazolopyrimidines is effected by the use of appropriate solvents.

EXAMPLE 7

*5,7-dimethyl-2-phenyl-oxazolo-(5,4-d) pyrimidine*

This compound when prepared by the method of Example 1 was obtained in 60% yield and recrystallized from aqueous solution with a melting point of 108–109° C.

EXAMPLE 8

*5,7-dimethyl-2-(4'-methoxyphenyl)-oxazolo-(5,4-d) pyrimidine*

This compound when prepared by the method of Example 1 was obtained in 38% yield when recrystallized from water, having a melting point of 176–177° C.

EXAMPLE 9

*5,7-dimethyl-2-(4'-chlorophenyl)-oxazolo-(5,4-d) pyrimidine*

This compound was obtained in 73% yield by the method of Example 1 and recrystallized from 95% ethanol; had a melting point of 196–197° C.

EXAMPLE 10

*5,7-dimethyl-2-(4'-nitrophenyl)-oxazolo-(5,4-d) pyrimidine*

This compound prepared in accordance with the method of Example 1 was obtained in 10% yield when recrystallized from methanol; had a melting point of 224–225° C.

EXAMPLE 11

*5,7-dimethyl-2-(4'-aminophenyl)-oxazolo-(5,4-d) pyrimidine*

This compound when prepared by catalytic reduction of the corresponding nitro compound of Example 10 was obtained in 50% yield at a melting point of 193° C. (dec.) when recrystallized from 95% ethanol.

EXAMPLE 12

*5-amino-7-methyl-2-chloromethyl-oxazolo-(5,4-d) pyrimidine*

This derivative when prepared by the method of Example 4 was recrystallized from benzene solution and had a melting point of 238–239° C. (dec.).

EXAMPLE 13

*5-chloro-2-phenyl-oxazolo-(5,4-d) pyrimidine*

The latter compound was prepared in accordance with the method of Example 2 in 62% yield and purified by sublimation at a melting point of 165–167° C.

EXAMPLE 14

*5-amino-2-phenyl-oxazolo-(5,4-d) pyrimidine*

This compound was prepared by the method of Example 4 and had a melting point of 285–287° C.

EXAMPLE 15

*5,7-diamino-2-(4'-chlorophenyl)-oxazolo-(5,4-d) pyrimidine*

This compound was prepared by the method of Example 3 and recrystallized from ethyl acetate; had a melting point of 316–318° C. (dec.).

EXAMPLE 16

*5,7-diamino-2-(4'-bromophenyl)-oxazolo-(5,4-d) pyrimidine*

This compound was prepared according to the method of Example 3 and obtained in 10% yield when recrystallized from ethyl acetate; had a melting point of 320–321° C. (dec.).

EXAMPLE 17

*5,7-diamino-2-(2'-bromophenyl)-oxazolo-(5,4-d) pyrimidine*

This compound was prepared in accordance with the method of Example 3 and obtained by recrystallization from ethyl acetate in 4% yield, having a melting point of 247–248° C. (dec.).

EXAMPLE 18

*7-amino-2-(3'-nitrophenyl)-oxazolo-(5,4-d) pyramidine*

The oxazolopyrimidine was obtained in 11% yield when recrystallized from ethyl acetate and had a melting point of 263–266° C. (dec.).

Since the cation is the physiologically active moiety in any non-toxic salt of the compounds described herein, non-toxic salts of the derivatives are equivalents of the uncombined bases described herein.

We claim:

1. A method for the preparation of compounds of the formula:

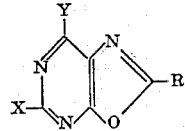

wherein R is selected from the class consisting of alkyl and phenyl groups and hydrogen, X and Y are selected from the class consisting of alkyl and amino groups, chlorine and hydrogen, which comprises reacting a pyrimidine of the general formula:

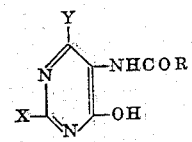

wherein R, X and Y have the above values, with phosphoryl chloride in the presence of from about 1 to 15% water.

2. The method which comprises reacting a 5-amido-4-hydroxypyrimidine with phosphoryl chloride in the presence of from about 1 to 15% water.

3. The method which comprises reacting a 5-amido-6-amino-4-hydroxypyrimidine with phosphoryl chloride in the presence of from about 1 to 15% water.

4. 2-phenyl-oxazolo-(5,4-d) pyrimidine.

5. 5 - amino - 7 - methyl - 2 - chloromethyl - oxazolo-(5,4-d) pyrimidine.

6. 5,7 - diamino - 2 - (3' - nitrophenyl) - oxazolo-(5,4-d) pyrimidine.

7. 7 - amino - 2 - (4' - chlorophenyl) - oxazolo-(5,4-d) pyrimidine.

8. 5 - dimethylamino - 2,7 - dimethyl - oxazolo-(5,4-d) pyrimidine.

References Cited in the file of this patent

Chemical Abstracts, 1st Decennial Subject Index, 1907–1916, page 4144.

Patterson et al.: The Ring Index, A. C. S., Monograph Series No. 84, (1940 edition), page 117.

Elion et al.: J. Am. Chem. Soc. Soc. 73, 5235–5239 (1951) (260–252).